US 8,489,485 B2

(12) United States Patent
Lange et al.

(10) Patent No.: US 8,489,485 B2
(45) Date of Patent: Jul. 16, 2013

(54) METHOD AND SYSTEM FOR EQUALIZING DEBT BALANCE AND FIXED ASSET VALUE IN REVERSE MORTGAGES

(75) Inventors: Jeffrey Lange, New York, NY (US); Jeffrey Lewis, New York, NY (US)

(73) Assignee: Guggenheim Partners, LLC, New York, NY (US)

( * ) Notice: Subject to any disclaimer, the term of this patent is extended or adjusted under 35 U.S.C. 154(b) by 529 days.

(21) Appl. No.: 12/287,326

(22) Filed: Oct. 8, 2008

(65) Prior Publication Data
US 2009/0119203 A1 May 7, 2009

Related U.S. Application Data

(60) Provisional application No. 61/002,172, filed on Nov. 7, 2007.

(51) Int. Cl.
*G06Q 40/00* (2012.01)

(52) U.S. Cl.
USPC ............................... 705/36 R; 705/38; 705/35

(58) Field of Classification Search
USPC .................................. 705/38, 36 R
See application file for complete search history.

(56) References Cited

U.S. PATENT DOCUMENTS

| 2002/0055905 A1* | 5/2002 | Jannah et al. ................... 705/38 |
| 2006/0015364 A1* | 1/2006 | Hays .................................. 705/1 |
| 2006/0089902 A1* | 4/2006 | Kim et al. ......................... 705/38 |
| 2006/0116951 A1* | 6/2006 | Kim et al. ......................... 705/38 |
| 2008/0120215 A1* | 5/2008 | Wagner ............................. 705/35 |

OTHER PUBLICATIONS

"DBRS Rates CHIP Mortage Trust at AAA" by Market News Publishing, Nov. 29, 2005.*

* cited by examiner

*Primary Examiner* — Kirsten Apple
(74) *Attorney, Agent, or Firm* — Winston & Strawn LLP

(57) ABSTRACT

A method and system for debt-to-asset-value balancing of a reverse mortgage benefiting both the lender and the borrower. Options and mechanisms are provided for equalizing borrower debt balance with appraised fixed assets of the reverse mortgage.

16 Claims, 5 Drawing Sheets

METHOD AND SYSTEM FOR EQUALIZING DEBT BALANCE AND FIXED ASSET VALUE IN REVERSE MORTGAGES

CROSS-REFERENCE TO RELATED APPLICATION

This application claims priority to U.S. Provisional Patent Application No. 61/002,172 filed Nov. 7, 2007, which is incorporated herein by reference.

FIELD OF INVENTION

The present technology generally relates to a method and system for providing reverse mortgages to borrowers. More particularly, the present technology relates to a method or a system designed to evaluate one or more reverse mortgage accounts to develop and offer options or mechanisms for equalizing debt balance and home value for the one or more reverse mortgage accounts to the benefit of borrowers and lenders.

BACKGROUND

In a mortgage, the homeowner/borrower makes a monthly payment to the lender. After each payment, the equity in the home increases and at the end of the mortgage term (for example, 15 or 30 years), the mortgage is paid in full and the property is transferred from the lender to the borrower. In contrast, in a reverse mortgage, the homeowner receives a loan (for example, an upfront payment or monthly payments) which accrues interest. Each payment to the borrower increases the debt on the property, which the borrower pays off using the proceeds of the future home sale.

In a reverse mortgage, the amount of the loan the borrower receives depends upon the borrower's age, Federal Housing Administration or Fannie Mae appraised value of the home, and the interest rate at the closing. Reverse mortgage loans provide a lump sum, credit line, or monthly payments to borrowers. The loans are secured against a first mortgage deed on the home. Unlike traditional mortgage loans, current interest or principal payments are not required and the credit quality of the borrower, as measured, for example, by a FICO score, is not relevant to underwriting of the loan. The loan is asset-based only, i.e., secured non-recourse against the property. Interest accrues and is compounded at the loan rate. As the debt balance grows, the loan to value (LTV) ratio typically increases over time, with the expectation that the last borrower will either move, die, or vacate the home for a period longer than 12 months before the LTV ratio exceeds one, at which point the lender begins to suffer losses.

The reverse mortgage loan amount is not taxable because the IRS does not consider loan advances to be income. The reverse mortgage ends when the homeowner dies, sells the home, or moves out of the house for 12 consecutive months. At that time, the reverse mortgage loan amount can be paid off with the proceeds of the home sale. Alternatively, heirs of the borrower can refinance the reverse mortgage. If the proceeds of the home sale exceed the loan amount, the homeowner receives the difference. On the other hand, if the proceeds of the home sale are insufficient to pay off the loan, the lender (or loan insurer) absorbs the difference. For the latter, the cap on the debt is called the non-recourse limit, and it means that the lender has no legal recourse to receive anything more than the value of the home when the reverse mortgage is paid off.

The reverse mortgage market is growing at over a 50% rate per annum as of 2007. The market is segmented into loans against homes with values less than approximately $400,000 and those above. For the former, borrowers are typically issued a Federal Housing Administration (FHA) insured Home Equity Conversion Mortgage or HECM. As of 2007, the loan rate for HECM's was 150 basis points over the constant maturity one year treasury bill, which includes 50 basis points of FHA insurance and which enables lenders to sell their loans to the FHA upon the loans attaining a 98% LTV ratio. For non-HECM or proprietary loans, the average rate as of 2007 was approximately 3 month London Interbank Offered Rate (LIBOR)+350 basis points. The amount of lump sum advance or credit line is determined by the principal limit factor or PLF. The PLF is a function of interest rates, assumed future housing price appreciation (HPA), and the mortality, morbidity, and mobility (MMM) of the borrower or borrowers. Typically, the older the borrower the higher the PLF and the greater amount of proceeds that the borrower can receive. Furthermore, the greater the expected morbidity and mobility or the borrower the greater the amount of proceeds the borrower can receive. For the LIBOR+350 product, a 70 year old female who owns a house appraised at $1 million, can expect to receive approximately $400,000 (as of 2007) in proceeds. The undrawn portion of the credit line increases with the loan rate in typical proprietary products.

For example, a 70-year-old borrower who receives $400,000 on a $1 million home in a proprietary reverse mortgage loan will have a debt balance at years 5, 10, 15, 20, and 25 as follows:

| Year | Debt Balance |
| --- | --- |
| 5 | $ 615,450 |
| 10 | $ 946,945 |
| 15 | $1,456,993 |
| 20 | $2,241,764 |
| 25 | $3,449,232 |

If the home value has not appreciated, then the debt balance exceeds the home value by over $450,000 at year 15, by over $1.24 million at year 20, and by over $2.449 million at year 25.

The reverse mortgage industry to date has failed to understand the implications to the borrower and the lender when the mortgage debt is not in balance with the home value throughout and at the end of the reverse mortgage term. For example, many lenders tout to their borrowers that reverse mortgages can provide "tax-free income." Indeed, a well-known book on reverse mortgages by Tom Kelly entitled, "The New Reverse Mortgage Formula: How to Convert Home Equity into Tax-Free Income," describes the so-called advantages of reverse mortgages. Although a reverse mortgage loan is not characterized as income under the Tax Code and therefore cannot be taxable, labeling a reverse mortgage loan as "tax-free income" belies the sophistication of the market with regard to tax matters.

Unfortunately, state of the art reverse mortgage loans reflect a more serious disregard by reverse mortgage lenders to appreciate the correct tax consequences of their loans. In particular, it is common for reverse mortgage lenders to characterize or tout the non-recourse nature of a reverse mortgage loan as a "heads borrower wins, tails lender loses" proposition. Lenders have designed their products with this assumption in mind with the consequence that the loan rate, the PLF, and whether the loan is fixed or variable, among other factors, will have a high probability in forcing a significant number of loans into default. However, the assumption that this default is costless to the borrower because reverse mortgage loans are "non-recourse" is false.

Current state of the art mortgage products do not address the serious tax consequence that can arise as the reverse mortgage debt balance rises above the mortgaged home's value. The tax consequences are best illustrated with the examples below based on the following assumptions: 1) Borrower's basis in home: $100,000; 2) Home's current value: $1,000,000; 3) Reverse mortgage proceeds: $400,000; 4) Reverse mortgage not original acquisition indebtedness; 5) Internal Revenue Code (IRC) section 121 requirements met; and 6) At death of Borrower: i) Outstanding loan balance is $2,000,000; and ii) Fair market value (FMV) of home is $1,000,000.

Example 1: If borrower is sole owner of property and dies before Dec. 31, 2009 or after Jan. 1, 2011 and a sale of the home takes place where debt balance is greater than FMV, the following is the tax consequence: i) Basis of property: step-up in basis to $1,000,000; ii) Gain: $1,000,000 (equal to debt balance of $2,000,000 minus $1,000,000 FMV); iii) Home equity deductions: $400,000 (accrued interest on $100,000 of the $400,000 mortgage); iv) Taxable Gain: $600,000; v) Federal Tax: $90,000 (15% capital gains rate on Taxable Gain); and vi) Who pays: a) if borrower left a will, the Executor pays out of estate assets; b) if borrower bequeathed property to individual, the individual is liable and should consider disclaiming his interest; and c) if borrower died intestate, Administrator pays out of estate assets.

A less likely scenario is the surviving spouse moving out of the home (e.g., into a nursing home) as shown in the following example. Scenario 2: First spouse dies after Jan. 1, 2011 and surviving spouse moves into nursing home or otherwise leaves home: i) Basis in property stepped up partially to $550,000; ii) Gain on sale=$1,450,000 ($2,000,000 debt balance−$550,000); iii) Home equity deductions: $400,000; iv) IRC section 121 Exclusion to surviving spouse: a) $500,000 if sale is in year of first spouse's death and joint return is filed; and b) $250,000 if sale is in a year after year of first spouse's death or if joint return is not filed; v) Taxable gain assuming sale more than a year after first spouse death: i) Taxable Gain=$1,450,000−$400,000−$250,000=$800,000; and vi) Federal Tax=$120,000 (15% capital gains rate on Taxable Gain).

As can be seen from the above scenarios, the borrower can be burdened with debt forgiveness taxation upon sale of the home when the debt balance exceeds the home value. The reverse mortgage industry is in a nascent state and is generally unsophisticated in tax matters and no loans have yet produced the above results. But the current state of the art loans will, given enough time, produce these adverse outcomes and borrowers will suffer financially. Lenders may also face legal and regulatory action by not disclosing these possible adverse outcomes to borrowers.

SUMMARY OF THE INVENTION

In one aspect, the present technology is directed to a method for equalizing debt balance to home value in a reverse mortgage including the steps of appraising of a reverse mortgage asset resulting in a reverse mortgage asset value, and using a principal limit factor module for determining the principal limit factor of the reverse mortgage. The principal limit factor is based on one or more principal limit factor criterion including a borrower's age, the borrower's health status, the reverse mortgage asset value, and the borrower's probability of moving.

The method also includes the step of creating a reverse mortgage security instrument between the borrower and a lender with an associated interest rate, and providing debt-to-asset-value equalization provisions in the reverse mortgage security instrument. The provisions include language granting the borrower the right to request borrower-initiated appraisals. The provisions also include language granting the lender the right to request lender-initiated appraisals. The borrower-initiated appraisals and the lender-initiated appraisals result in a reappraised reverse mortgage asset value. Debt-to-asset-value equalization provisions also define a debt-to-asset-value reduction value and a debt-to-asset-value increase value.

The method also includes providing a credit line, a lump sum, or a plurality of tenure payments to the borrower at the associated interest rate, providing an accrual module for accruing a total reverse mortgage debt which is the total debt advanced to the borrower at the associated interest rate, and providing a debt-to-asset-value equalization module to determine a ratio equal to reappraised reverse mortgage asset value over the total reverse mortgage debt.

The method also includes reducing the associated interest rate if the ratio is less than or equal to the debt-to-asset-value reduction value and increasing the associated interest rate if the ratio is equal to or greater than the debt-to-asset-value increase value.

In one aspect, the present technology is directed to a method for equalizing debt balance to home value in a reverse mortgage including the steps of appraising of a reverse mortgage asset resulting in a reverse mortgage asset value, and using a principal limit factor module for determining the principal limit factor of the reverse mortgage. The principal limit factor is based on one or more principal limit factor criterion including a borrower's age, the borrower's health status, the reverse mortgage asset value, and the borrower's probability of moving.

The method also includes the step of creating a reverse mortgage security instrument between the borrower and a lender with an associated interest rate, and providing debt-to-asset-value equalization provisions in the reverse mortgage security instrument. The provisions include language granting the borrower the right to request borrower-initiated appraisals. The provisions also include language granting the lender the right to request lender-initiated appraisals. The borrower-initiated appraisals and the lender-initiated appraisals result in a reappraised reverse mortgage asset value. Debt-to-asset-value equalization provisions also define a debt-to-asset-value reduction value and a debt-to-asset-value increase value.

The method also includes providing a credit line, a lump sum, or a plurality of tenure payments to the borrower at the associated interest rate, providing an accrual module for accruing a total reverse mortgage debt which is the total debt advanced to the borrower at the associated interest rate, and providing a debt-to-asset-value equalization module to determine a ratio equal to reappraised reverse mortgage asset value over the total reverse mortgage debt.

The method also includes providing an excess debt conversion module to convert an amount of the total reverse mortgage debt into an interest in the reverse mortgage asset to the lender if the ratio is less than or equal to the debt-to-asset-value reduction value. The amount is equal to or less than the excess of the total mortgage debt over the reappraised reverse mortgage asset value.

The method also includes increasing the associated interest rate if the ratio is equal to or greater than the debt-to-asset-value increase value.

In a further embodiment, the step of reducing the associated interest rate also includes the step of providing a low interest coupon, and the step of increasing the associated interest rate further includes providing a high interest coupon.

In a further embodiment, the debt-to-asset-value reduction value is a percentage and the debt-to-asset-value increase value is a percentage. In a further embodiment the debt-to-asset-value reduction percentage is 80, and the debt-to-asset-value increase percentage is 90.

In a further embodiment, the reverse mortgage asset is a home.

In one aspect, the present technology is directed to a client server system configured to provide each of the methods described above. The client server system includes a client computer and a server computer coupled over a network.

In a further embodiment of the client-server system, the accrual module is executed in an automatic or background process of the server computer.

In a further embodiment of the client-server system, the borrower-initiated appraisal is initiated by a first request of the client computer and the lender-initiated appraisal is initiated by a second request of the client computer, the first and second requests received by the server computer.

In a further embodiment of the client-server system, the step of reducing the associated interest rate includes executing an associated interest rate modification module as a first background process to gradually reduce the associated interest rate. Furthermore, the step of increasing the associated interest rate includes executing the associated interest rate modification module as a second background process to gradually increase the associated interest rate.

In a further embodiment of the client-server system, the method also includes providing a minimum target interest rate, a rate decrement, and a time interval. After the passing of time equal to the time interval, the first background process reduces the associated interest rate by an amount equal to the rate decrement until the associated interest rate equals the minimum target rate.

In a further embodiment of the client-server system, the method also includes providing a maximum target interest rate, a rate increment, and a time interval. After the passing of time equal to the time interval, the second background process increases the associated interest rate by an amount equal to the rate increment until the associated interest rate equals the maximum target rate.

In a further embodiment of the present technology, step of converting excess debt to an equity interest includes creating a fee simple interest in the name of the lender. In the alternative, the equity interest is a remainder interest in the lender.

In one aspect, the present technology is directed to a method for setting up a reverse mortgage and executing an equalization software module which compares the borrower's current debt balance on the reverse mortgage to the current appraised asset value. Based on the comparison, the method includes either reducing the associated interest rate of the mortgage to bring the debt down toward the current asset value, or increasing the associated interest rate to raise the debt toward the current asset value.

The method includes the steps of appraising an asset to obtain an original appraisal value of the asset, entering a borrower information set including at least one of the borrower's age, the borrower's health status, and the probability of the borrower moving from the asset. These steps can be practiced by a borrower or the borrower's agent. The borrower's information can be entered on a computer and stored in a memory of the computer. The information can be used together with the appraised value of the asset to create the reverse mortgage financial instrument.

The method further includes creating a reverse mortgage security instrument based on the borrower information set and the original appraisal value of the asset, the reverse mortgage security instrument having an associated interest rate, and providing a credit line, a lump sum, or a plurality of tenure payments to the borrower at the associated interest rate.

The reverse mortgage includes language granting the borrower and the lender the right to obtain a reappraisal of the asset. Also, the language includes information on when to modify the associated interest rate to either raise or lower the debt balance to bring it in line with the current asset value.

The method further includes accruing the debt to the borrower to obtain a current reverse mortgage debt balance, and providing a set of software instructions embodied on a tangible medium, the set of software instructions for comparing a current appraisal value of the asset to the current reverse mortgage debt balance. For example, the comparison can include computing a ratio of debt-to-asset-value at which to lower the associated interest rate. The ratio can equal the current asset value divided by the debt owed on the reverse mortgage. The value can be expressed as a percentage, for example, 80%.

The method further includes executing the set of software instructions on a computer to obtain an equalization ratio of debt-to-asset-value, and modifying the associated interest rate based on the equalization ratio.

In a further embodiment, the method includes step of defining as part of the reverse mortgage security instrument a debt-to-asset-value reduction ratio and a debt-to-asset-value increase ratio. The associated interest rate can be reduced if the equalization ratio is less than or equal to debt-to-asset-value reduction ratio, or it can be increased if the equalization ratio is greater than or equal to debt-to-asset-value increase ratio. For example, the associated interest rate would be lowered if the current asset value equaled $750,000, and the debt owed equaled $1,000,000, producing a ratio of 0.75 or 75%. Assuming the debt-to-asset-value reduction ratio equaled 80%, here, the associated interest would be lowered, since 75% is less than 80%.

In a further embodiment, a maximum and minimum associated interest rate can be defined such that the current associated interest rate is never higher or lower than the maximum or minimum rates, respectively. For example, the minimum associated interest rate can be set to the interest rate incurred on the lender or a market rate, for example, prime rate.

In a further embodiment, the method includes reappraising the reverse mortgage asset in response to a borrower request. The current appraisal value of the asset is set to the reappraised value. In the alternative, reappraising the reverse mortgage asset can be in response to a lender request.

In a further embodiment, the method includes providing a reverse mortgage equalization module, and executing the reverse mortgage equalization module on the computer after every passing of a predetermined time interval. Here, the reverse mortgage equalization module performs the accrual step and the comparison of the debt balance to current asset value. Based on the debt-to-asset-value reduction ratio and the debt-to-asset-value increase ratio, the equalization module modifies the associated interest rate. The equalization module performs these steps at the predetermined interval, instigated by a timer, which sends a signal to the equalization module to reexecute after the passing of the predetermined time interval The predetermined time can be 30 days, 6 months, 1 year or any time interval deemed appropriate based on the goals of the lender and borrower, changing market conditions, or other pertinent factors. The time interval can be modified if, for example, interest rates were increasing rapidly or if home values were appreciating rapidly.

In one aspect, the present technology is directed toward a method for equalizing debt balance to home value in a reverse mortgage including the step of executing an accrual module for accruing a total reverse mortgage debt on the reverse mortgage which is the total debt advanced to a borrower by a lender at an associated interest rate of the reverse mortgage.

The reverse mortgage is defined in a security instrument including debt-to-asset-value equalization provisions. The debt-to-asset-value equalization provisions include language granting the borrower the right to request borrower-initiated appraisals, and language granting the lender of the reverse mortgage the right to request lender-initiated appraisals. The borrower-initiated appraisals and the lender-initiated appraisals result in one or more reappraised reverse mortgage asset values. The debt-to-asset-value equalization provisions define a debt-to-asset-value reduction value and a debt-to-asset-value increase value.

Information regarding the reverse mortgage and the debt-to-asset value equalization provisions can be supplied to the method in any number of ways including, but not limited to, manual input of the information, transmittal of the information over a network, or by storing the information on a memory device.

The method further includes executing a debt-to-asset-value equalization module to determine a ratio equal to a reappraised reverse mortgage asset value over the total reverse mortgage debt. The module reduces the associated interest rate if the ratio is less than or equal to the debt-to-asset-value reduction value. In the alternative, the module increases the associated interest rate if the ratio is equal to or greater than the debt-to-asset-value increase value.

In a further embodiment, the aforementioned method is executed in a software program tangibly embodied on a memory device. The software program contains executable code loaded into a computer for executing the steps of the method.

BRIEF DESCRIPTION OF THE DRAWINGS

So that those having ordinary skill in the art to which the disclosed system appertains will more readily understand how to make and use the same, reference may be had to the following drawings.

DESCRIPTION

The present disclosure overcomes many of the prior art problems associated with protected remainder interest financial instruments. The advantages, and other features of the systems and methods disclosed herein, will become more readily apparent to those having ordinary skill in the art from the following detailed description of certain preferred embodiments taken in conjunction with the drawings which set forth representative embodiments of the present invention. All relative descriptions herein such as left, right, up, and down are with reference to the Figures, and not meant in a limiting sense.

Figure 1:
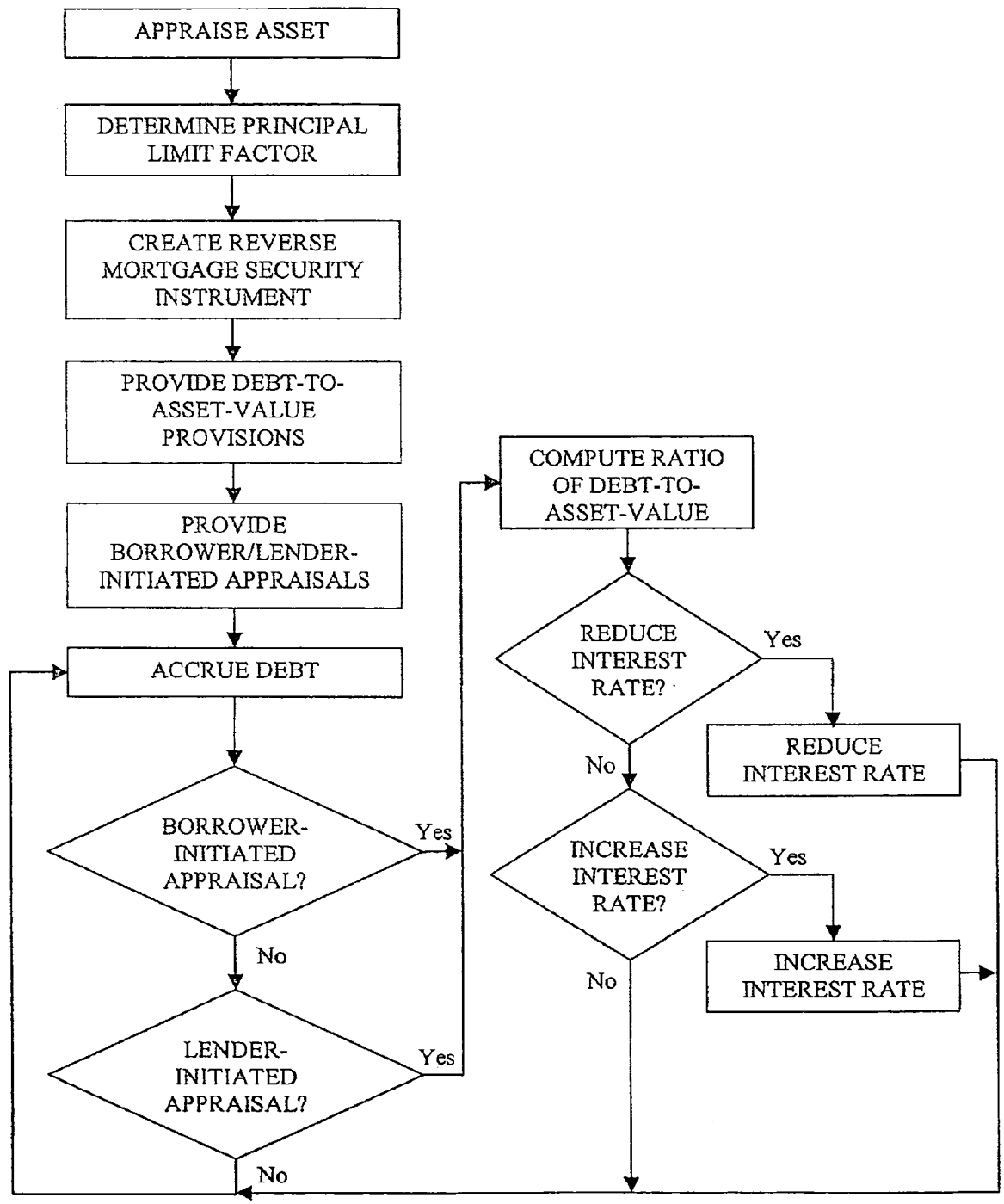
FIG. 1 is a flow chart depicting an embodiment of the invention related to reducing or increasing the associated interest rate of the reverse mortgage based on the ratio of debt-to-asset-value.

In an embodiment shown in FIG. 1, the steps of creating a reverse mortgage include: 1) Appraisal of the home; 2) Determination of principal limit factor for reverse mortgage based upon the borrower's age, possible health status, home value, probability of moving, and other factors such as location of the home; 3) Proving a credit line, lump sum, or tenure payments with an associated interest rate; 4) Accruing debt proceeds advanced to the borrower at the nominal stated associated interest rate; 5) Providing the borrower the right to request an appraisal at a future date; 6) Providing language in the security instrument which reduces or eliminates the stated interest rate in the event the borrower's requested appraisal results in a home value which is a triggering percentage less than the current debt balance; 7) Providing the lender the right to request an appraisal at a future date subsequent to a reduction or elimination in the stated interest rate; and 8) Providing language in the security instrument which provides for the reinstatement or increase of the state interest rate should the lender's requested appraisal result in a home value estimate greater than a triggering percentage of the then current debt balance.

The result of following the above steps of the an embodiment of the invention can result in the following language representing one or more portions, in relevant part, of the reverse mortgage security instrument.

Suspension of Interest Accrual Upon Decrease in Property Value

Subject to the limitations below, upon the written request of Borrower, Lender will order an appraisal of the Property ("New Appraisal"), the cost of which will be paid by Borrower. If the New Appraisal indicates that the value of the Property is less than 80% of the outstanding balance (to be determined by the servicer of the loan) of the Note at the time of the New Appraisal, the amount due under the Note will cease to accrue interest on first day of next month. Interest will again begin to accrue on the amount secured by the Note on the first day of the month following a subsequent appraisal ("Subsequent Appraisal"), ordered in the sole discretion of, and paid for by, the Lender, indicates that value of the Property is more than 90% of the outstanding balance of the Note at the time of the Subsequent Appraisal.

Borrower shall have no right to refute, appeal or challenge the result of either a New Appraisal or Subsequent Appraisal. Furthermore, Borrower may not request that interest accrual be suspended based on an independent appraisal obtained directly by Borrower. The accrual of interest will be suspended only when a New Appraisal requested by Borrower and ordered by Lender indicates that the value of the Property meets the requirement set forth above.

Borrower may request an initial New Appraisal no more frequently than once every 12 months. If the initial New Appraisal indicates that the value of the Property is more than 80% of the outstanding balance of the Note, the Borrower may not request an additional New Appraisal for at least 12 months after the date on which the last appraisal was requested. However, if the accrual of interest has been suspended based on a New Appraisal, and Lender has obtained a Subsequent Appraisal that will cause interest to resume accruing, Borrower may again request a New Appraisal after 6 months.

Any amounts disbursed by Lender under this Paragraph shall become additional debt of Borrower as provided for in the Loan Agreement and shall be secured by this Security Instrument.

In the above instrument, the new appraisal percentage and subsequent appraisal percentage are not limited to 80% and 90%, respectively, but can be any amount deemed appropriate by one skilled in the art, for example, the new appraisal percentage could be 90% and the subsequent appraisal percentage could be 95%.

In one aspect, the present technology is directed toward providing a borrower a reverse mortgage that includes switching the loan rate of the reverse mortgage. In this embodiment, the loan rate of a reverse mortgage switches regimes from a high coupon to low coupon or from a low coupon to a high coupon. The term "coupon" is defined as the loan rate of the reverse mortgage. If the reverse mortgage is a floating rate loan, the loan rate is the sum of the floating rate index (e.g., 3 month LIBOR, one year constant maturity treasury bill, etc.) and the margin. The term margin is defined as the amount above the floating rate index. For example, a typical proprietary jumbo loan might have a loan rate equal to 1 month LIBOR plus a margin of 350 basis points. If one month LIBOR is equal to 5%, then the loan rate (for the period that LIBOR remains at 5%) is equal to 8.5%. Here, the coupon refers to the full 8.5% rate. For a fixed rate reverse mortgage, the loan rate remains fixed and does not reset based upon an index such as LIBOR.

As a reverse mortgage loan is non-recourse to the borrower, the maximum amount of principal plus accrued interest that the lender can collect is equal to the minimum of the accrued debt balance and the home value at any given time. At inception, the loan rate is set to account for a certain number of loans which have home values insufficient to cover the then existing debt balance. As a corollary, the future home price appreciation (HPA) is generally assumed in the art to be much lower than the loan rate. For example, a reverse mortgage loan rate for a 70 year old might be 8.5% on proceeds of $400,000 for a home worth $1,000,000, and the lender might assume HPA of 2% per annum.

Figure 4:
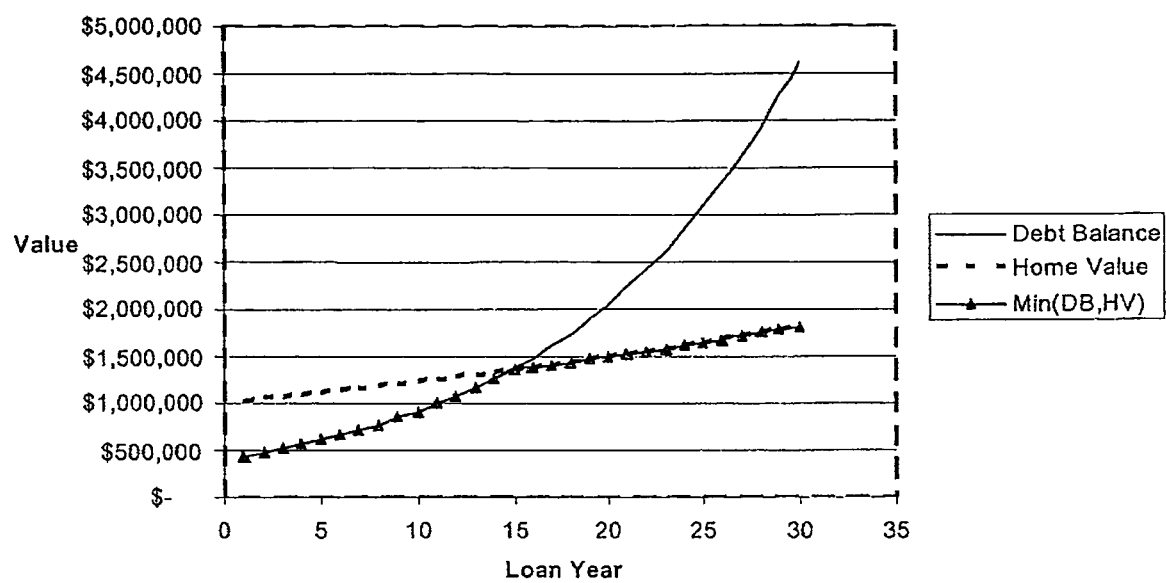
FIG. 4 is a graph depicting a relationship between debt balance and asset value.

The minimum debt balance and home value are shown in FIG. 4. The minimum of the debt balance and home value can represent the proceeds payable. As shown in FIG. 4, proceeds payable equals the loan rate until approximately year 15 when the debt balance begins to exceed the home value. After this point, the lender's recovery grows only with future HPA, which in FIG. 4 is assumed to be 2% (but may be higher or lower).

In the reverse mortgage of the present technology, the loan rate is modified when the debt balance begins to exceed the home value which in FIG. 4 occurs at year 15. The security instrument can include language to trigger a change in the loan rate as a function of the ratio of the current home value to the current debt balance. For example, the loan rate reduction trigger can be set to reduce the loan rate when the current home value is less than, for example, 80% of the then current debt balance. In a further embodiment, the loan rate can be set to 0.

The current home value can be determined using a standard home appraisal well known in the art. The borrower can request an appraisal to determine whether the loan rate reduction trigger has been met and the loan rate should be reduced.

Furthermore, subsequent to any loan rate reduction, a loan rate restoration or increase trigger can restore the loan rate to the original loan rate or increase the loan rate based on a reduction in the ratio of current home value to current debt balance. Here, the lender may request an appraisal to determine whether the original loan rate can be restored or the current loan rate increased in accordance with the security agreement. For example, the security instrument might provide that the loan rate is to be restored to the original rate should the current value of the home exceed 90% of the current value of the debt balance.

The above described tax-efficient reverse mortgage would therefore minimize the extent to which the debt balance exceeds the home value at each point in time by having a loan rate responsive to the changing ratio of home value to debt balance. The loan rate can be designed to switch to a low rate or zero rate when the trigger ratio has been met. Alternatively, the loan rate can be designed to gradually decrease as the ratio of home value to debt balance decreases (below one, for example). The loan rate can increase or be reinstated to its original rate should of the ratio of home value to debt balance begin to increase. The loan rate increase can either switch to high rate or gradually increase as the ration of home value to debt balance increases.

The historical home price appreciation (HPA) is the appreciation in a home which has occurred over the life of a loan. A low or negative HPA can result in a future home value which is less than the future debt balance at an earlier time in the loan's life. The low or negative HPA is likely to hasten or be correlated with the debt balance of the home exceeding the home value, a condition which can be mitigated or avoided by lowering the loan rate.

Most reverse mortgages are floating rate loans in which the borrower receives a loan rate tied to a floating rate index, such as 1-year constant maturity treasury bills, or one month LIBOR. A margin is added to the floating rate index. Higher interest rates can cause the floating rate to go up, which can hasten the excess in the debt balance over the home value at an earlier time in the reverse-mortgage lifespan. If HPA increases do not keep pace with increases interest rates, then the debt balance is more likely to exceed the home value.

Figure 2:
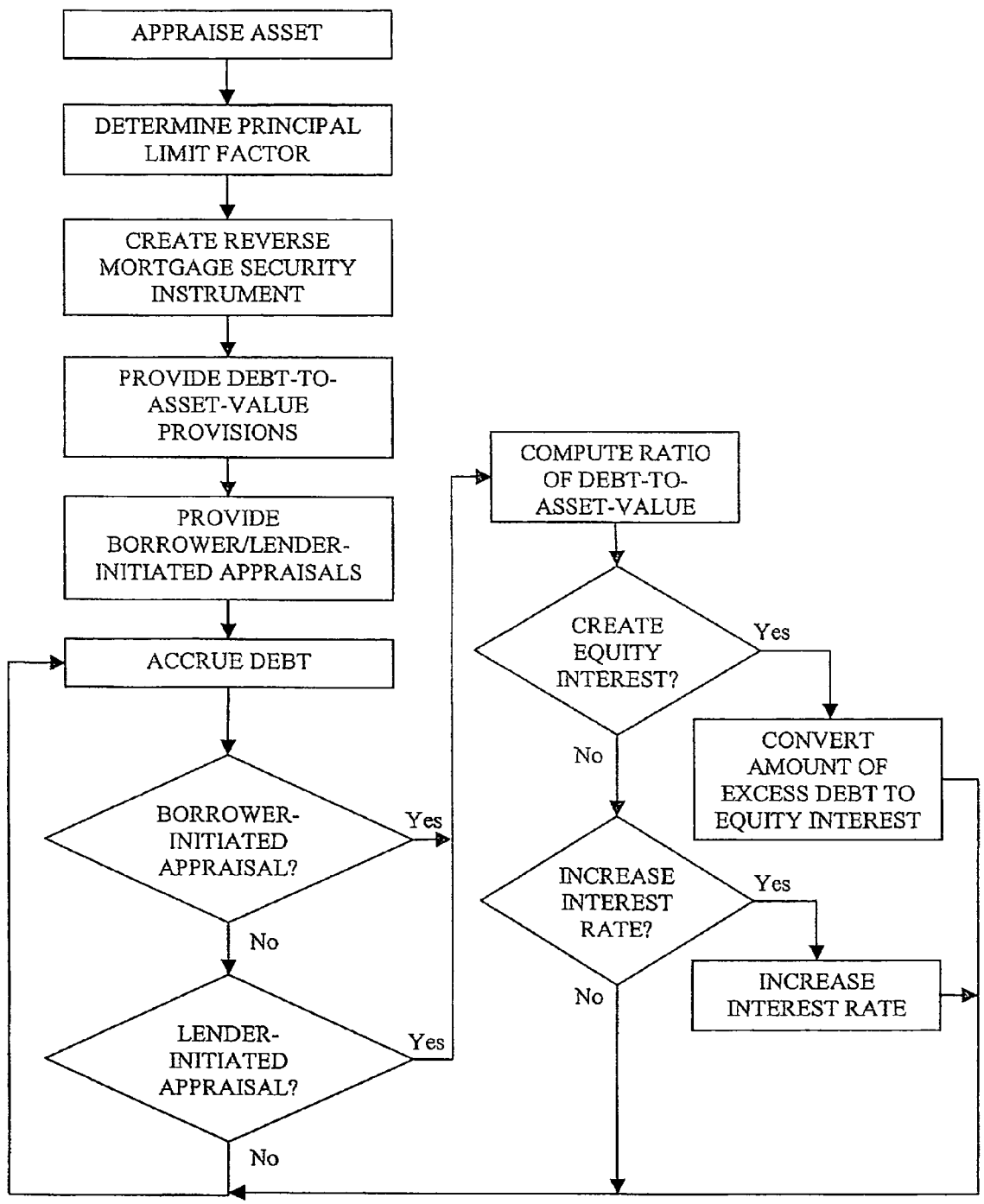
FIG. 2 is a flow chart depicting an embodiment of the invention related to reducing excess debt balance over asset value by converting an amount of the excess debt to an equity interest.

In one aspect shown in FIG. 2, the present technology is directed toward providing a borrower a tax-efficient reverse mortgage including conversion of the reverse mortgage debt. In a convertible reverse mortgage, the borrower may have the option to convert part of the debt of the reverse mortgage held by a lender in comparison to the equity owned by the lender.

For example, the borrower may request an appraisal which may reveal that the home's value is only 80% of the debt balance. Since 20% of the loan is currently in default, it presents the inefficiency of continued OID accrual for the lender for amounts unlikely to be received and potential debt forgiveness tax for the borrower on the amount in default. To remedy this, a portion of the debt may be converted to equity. For example, if the debt balance is $1,000,000 and the home value is $800,000, $200,000 of the debt balance can be converted from debt to an equity interest in the home. The equity interest can be any valid interest in the home, for example, a fee simple interest or a remainder interest. The borrower is deemed to have sold that portion of the home represented by the equity interest to the lender. Typically, no capital gains tax would be owed on sold equity interest as homeowner's who have lived in the home for more than 3 years as their primary residence would be able to use their gains exclusion under Section 121 of the Internal Revenue Code.

In a further embodiment, the option held by the borrowers depends on, for example, the LTV. The borrower can determine, for example, whether the risk of paying capital gains tax on the amount by which the debt balance then exceeds the home value is greater than the cost of converting a portion of the debt to equity. By so converting, the borrower is able to eliminate a portion of the debt balance and future accruals thereon, which reduces the likelihood of the borrower having debt forgiveness taxation on the excess of debt balance over home value. The benefit from conversion must be weighted against the cost. If, for example, the home value were to recover during a period of high HPA, then the borrower's choice to have the lender convert some of its debt to equity would result in the lender receiving the benefit of the home appreciation. The borrower's decision will likely be a function of the current LTV (i.e., how much the debt balance currently exceeds the home value), prospects for future HPA increases, likelihood of future rate increases, age and other factors.

In one aspect, the present technology is directed toward providing a borrower a reverse mortgage called a buy-down reverse mortgage wherein the borrower buys down future growth in reverse mortgage debt. In a buy-down reverse mortgage, the borrower buys down future growth in the debt balance to insure against the outcome of the debt balance exceeding the home value upon an event requiring payment of the loan balance, e.g., the borrower's death, need to move into a nursing home for a period of 12 months or more, or other need to leave the home. In one embodiment, the buy down can be the payment of "points" upfront in exchange for a lower rate. Such a buy-down might occur at anytime in the life of the loan but more typically it occurs at loan inception. For a modest amount of points, the loan rate can be reduced substantially enough to significantly lower the probability that the future debt balance exceeding the home value will result in borrowers having to pay debt forgiveness taxation.

Figure 3:
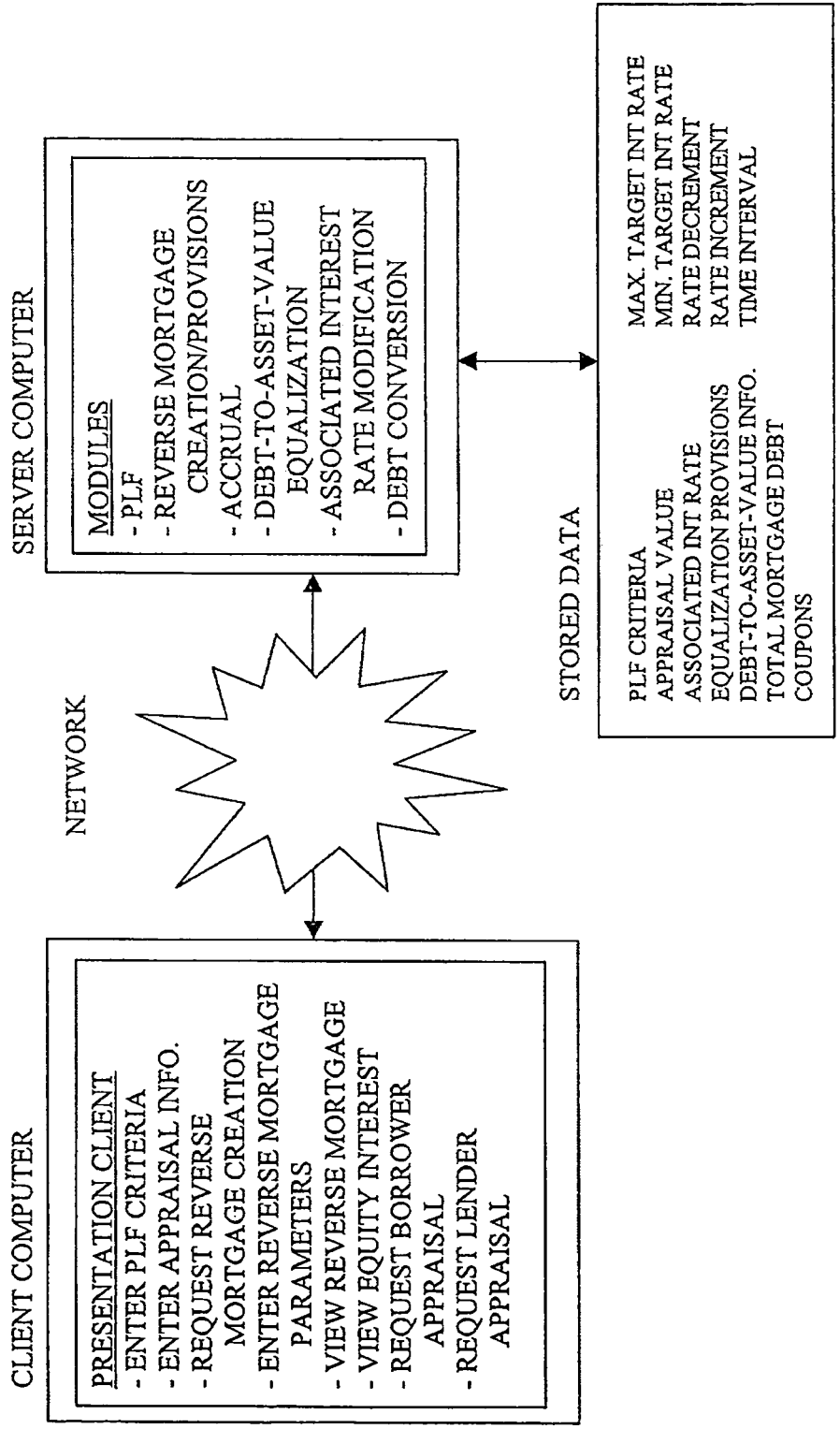
FIG. 3 is a block diagram depicting an embodiment of the invention including a client and server computer.

As shown in FIG. 3, the present technology can include a client-server system configured to provide the methods of the embodiments described above. The client-server system is comprised of a client and server computer coupled over a network. The client computer includes a CPU, memory, a display device, input devices and other components for executing client software. The client software includes a windowing system generally implemented in operating system software such as Microsoft Windows. The client software can include graphical user software for accepting user input, displaying information, and communicating with other computers and devices over the network. For example, the client software can be web-enabled software such as Internet Explorer.

The server computer also includes a CPU, memory, and other devices. The server computer is includes a data memory for storing important information for executing the methods of the present technology. The information can be represented in a relational database or file format. The server includes modules for executing the various methods of the embodiments of the present technology. The modules can be independent software programs for executing specific functionality or separate routines of a single application program.

The client software implements the client-side functionality of the present technology including, but not limited to, entering of borrower information, sending client requests to the server, entering parameters for the reverse mortgage, and viewing information related to reverse mortgage and equity interest. Entering of borrower information can include information related to determining a principal limit factor of the reverse mortgage, for example, borrower age and health information. Requests to server can include, but are not limited to, requests to create the reverse mortgage security instrument, requests to initiate an appraisal, and requests for information reporting on the reverse mortgage or equity interest.

The requests can include parameters entered by the client user. The client user can be the borrower, the borrower's agent, the lender, or any other person with an interest in the reverse mortgage. The client user can request and obtain information related to the reverse mortgage or equity interest, for example, an electronic version of the reverse mortgage security interest. The client user can initiate an appraisal of the reverse mortgage asset. Appraisals of fixed assets, for example, a home, are well-known in the art.

The server includes software modules for executing various steps of the embodiments of the present technology. For example, a principal limit factor module takes criteria entered by the client user to compute a principal limit factor. The mortgage creation module creates the reverse mortgage. The mortgage creation module works in conjunction with other modules to create provisions in the reverse mortgage including language granting the borrower and the lender the right to request an appraisal during the mortgage term. Furthermore, the creation module defines a debt-to-asset-value increase and reduction value. An accrual module accrues the total reverse mortgage debt. A debt-to-asset-value equalization module computes the ratio of asset value over debt balance. The asset value may be a reappraised asset value, for example, as a result from a borrower-initiated request to reappraise the asset of the reverse mortgage. The debt balance is the current debt balance of the reverse mortgage computed by the accrual module.

The associated interest rate is reduced if the ratio is equal to or less than the debt-to-asset-value reduction value. Alternatively, the associated interest rate is increased if the ratio is equal to or greater than the debt-to-asset-value increase value.

Figure 5:
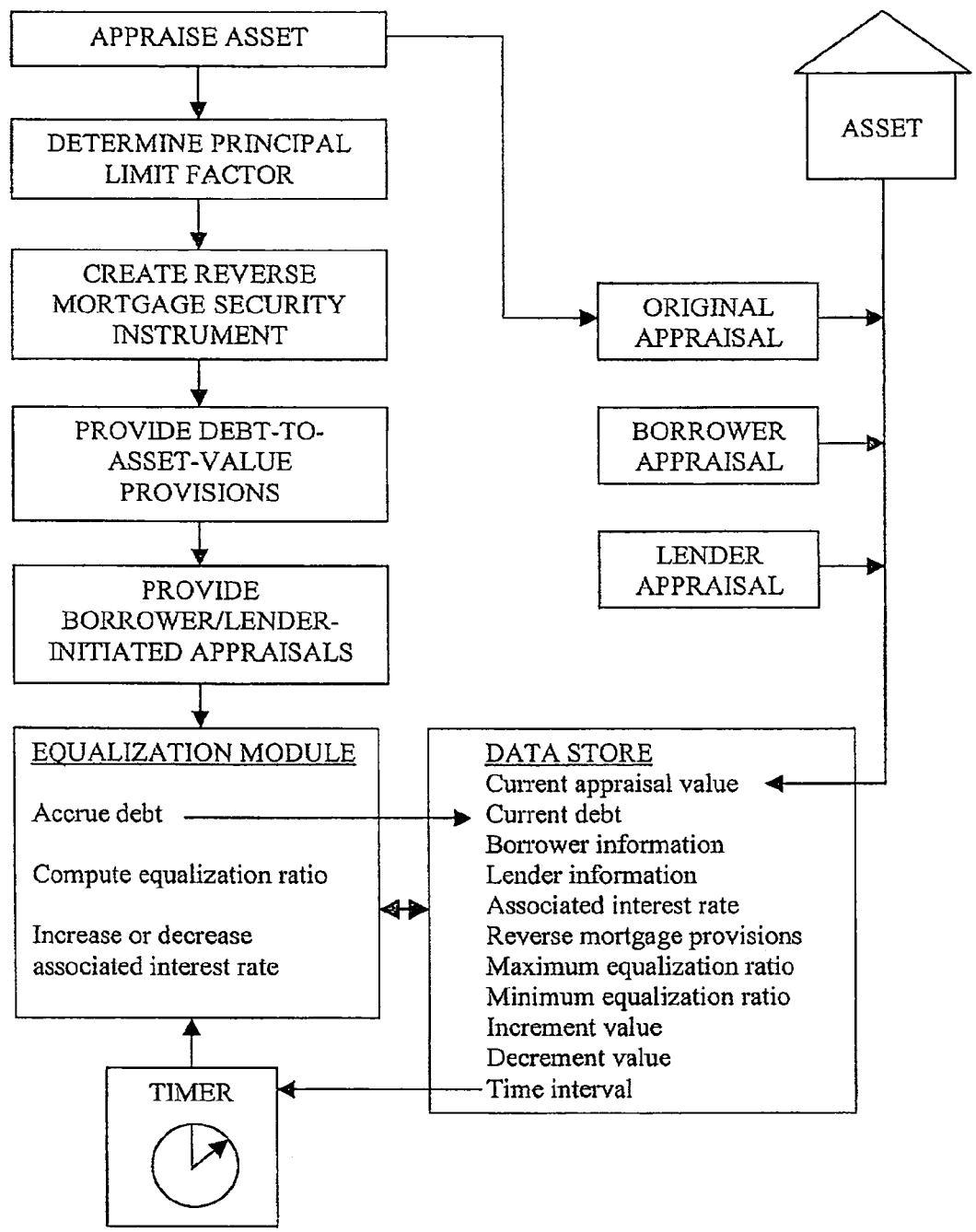
FIG. 5 is a block diagram depicting an embodiment of the invention including steps to create a reverse mortgage, a equalization module, a timer, and a data store.

In one aspect of the present technology shown in FIG. 5, the present technology includes a method of providing an equalization module and a date store. The equalization module automatically computes the accrual of debt on a reverse mortgage. The debt value is stored in the data store along with other important parameters related to the reverse mortgage. The parameters include, but are not limited to, the current appraisal value of the asset, the current borrower debt on the mortgage, borrower information (for example, borrower's age and health status), lender information, and the associated interest rate of the reverse mortgage.

Other provisions related to the reverse mortgage can be saved in the data store, for example, portions of the language of the reverse mortgage related to rights of the borrower and lender and equalization criteria needed to implement the equalization module and to bring the debt owed on the mortgage into line with the current asset value. For example, the data store includes a maximum equalization ratio and minimum equalization ratio, for example, 90% and 80%, respectively. The equalization ratio can be computed by dividing the current asset value by the current debt balance. The current asset value may be the original asset value at the inception of the mortgage or a reappraised asset value resulting from a reappraisal of the asset initiated by the borrower or the lender.

The data store also includes an increment value and a decrement value. Here, if the equalization ratio [(asset value)/debt]*100% equaled 75%, the associated interest rate on the debt would be decreased by the decrement value, for example, 0.1%, at every time interval, until the equalization ratio equaled 80%. Alternatively, if the equalization ratio equaled 110%, the associated interest rate on the debt would be increased by the increment value, for example, 0.075%, at every time interval.

The equalization module executes after the expiration of time equal to the time interval. A timer keeps track of the current time and the last time the equalization module was executed. After the expiration of the predetermined time interval, the timer sends a signal to the equalization module to reexecute.

The equalization module can execute as a background or automatic process of the computer.

In one aspect, the present technology is directed toward a database structure tangibly stored on a media device. The database structure comprises data for defining a reverse mortgage between a borrower and a lender involving a fixed asset. The database also includes data related to equalizing the debt owed on the mortgage to the current asset value, which is used to modify the interest rate on the mortgage. Alternatively, the information can be used to convert a portion of the debt owed on the mortgage to an equity interest in the asset in the name of the lender.

Debt-to-asset-value balancing of the reverse mortgage of the present technology can benefit both the lender and the borrower. The lender benefits because the debt balance is kept in line with the home value. Furthermore, the lender has a substantial cost in the continuing accrual of debt balance since the lender owes OID tax on the accrual whether the amount is actually received at a later date or not. Furthermore, the lender's recovery on the debt balance when the mortgage is due is limited to the value of the home because a reverse mortgage is a non-recourse loan. Thus, the lender will suffer a loss of any excess debt balance over the home value. The borrower benefits because the borrower will have to pay taxes on any excess of debt balance over the proceeds from the sale of the home.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for equalizing debt balance to value in a reverse mortgage security instrument on a computer comprising the steps of:
    appraising of a reverse mortgage asset resulting in a reverse mortgage asset value, wherein the reverse mortgage asset is owned by a borrower;
    electronically using an electronic principal limit factor module on the computer for determining the principal limit factor of the reverse mortgage security instrument, the principal limit factor based on at least one principal limit factor criterion including:
        a borrower's age;
        the borrower's health status;
        the reverse mortgage asset value; and
        the borrower's probability of moving;
    creating the reverse mortgage security instrument between the borrower and a lender with an associated interest rate, the reverse mortgage security instrument having a debt component and an equity component in which title transfers from the borrower to the lender;
    creating one or more debt-to-asset-value equalization provisions in the reverse mortgage security instrument comprising:
        language granting the borrower the right to request one or more borrower-initiated appraisals during the reverse mortgage security instrument; and
        language granting the lender the right to request one or more lender-initiated appraisals during the reverse mortgage security instrument, the one or more borrower-initiated appraisals and the one or more lender-initiated appraisals resulting in one or more reappraised reverse mortgage asset values, and the one or more debt-to-asset-value equalization provisions defining a debt-to-asset-value reduction value and a debt-to-asset-value increase value;
    creating a credit line, a lump sum, or a plurality of tenure payments to the borrower at the associated interest rate;
    creating an electronic accrual module for accruing a total reverse mortgage debt which is the total debt advanced to the borrower at the associated interest rate;
    electronically creating an electronic debt-to-asset-value equalization module on the computer to determine a ratio equal to the one or more reappraised reverse mortgage asset values over the total reverse mortgage debt based upon the reappraised reverse mortgage asset values;
    reducing the associated interest rate in the debt component of the reverse mortgage security instrument if the ratio is less than or equal to the debt-to-asset-value reduction value; and
    increasing the associated interest rate in the debt component of the reverse mortgage security instrument if the ratio is equal to or greater than the debt-to-asset-value increase value.

2. The method of claim 1 wherein the step of reducing the associated interest rate further includes the step of providing a low interest coupon, and the step of increasing the associated interest rate further includes providing a high interest coupon.

3. The method of claim 1 wherein the debt-to-asset-value reduction value is a percentage and the debt-to-asset-value increase value is a percentage.

4. The method of claim 3 wherein the debt-to-asset-value reduction percentage is 80, and the debt-to-asset-value increase percentage is 90.

5. The method of claim 1 wherein the reverse mortgage asset is a home.

6. The method of claim 1 further comprising:
    the step providing a client server system comprising a client computer and a server computer, the client and server computers coupled over a network, wherein the computer is the server computer; and
    the step of using a principal limit factor module further comprises:
    executing the principal limit factor module on the server computer in response to a request from the client computer, the request including the at least one principal limit factor criterion;
    the step of creating the reverse mortgage security instrument further comprises:
    executing a mortgage creation module on the server computer to create the reverse mortgage security instrument;
    the step of providing the accrual module further comprises:
    executing the accrual module on the server computer;
    the step of providing the debt-to-asset-value equalization module further comprises:
    executing the debt-to-asset-value equalization module on the server computer;
    the step of reducing the associated interest rate further comprises:
    executing an associated interest rate modification module on the server computer to reduce the associated interest rate; and
    the step of increasing the associate interest rate further comprises:
    executing the associated interest rate modification module on the server computer to increase the associate interest rate.

7. The method of claim 6 wherein the accrual module is executed in an automatic or background process of the server computer.

8. The method of claim 6 wherein the one or more borrower-initiated appraisals is initiated by a first request of the client computer and the one or more lender-initiated appraisals is initiated by a second request of the client computer, the first and second requests received by the server computer.

9. The method of claim 6 wherein the step of reducing the associated interest rate further comprises:
   executing the associated interest rate modification module as a first background process to gradually reduce the associated interest rate; and
   the step of increasing the associated interest rate further comprises:
   executing the associated interest rate modification module as a second background process to gradually increase the associated interest rate.

10. The method of claim 9 further comprising to step of:
   providing a minimum target interest rate, a rate decrement, and a time interval, wherein after the passing of time equal to the time interval, the first background process reduces the associated interest rate by an amount equal to the rate decrement until the associated interest rate equals the minimum target rate.

11. The method of claim 9 further comprising to step of:
   providing a maximum target interest rate, a rate increment, and a time interval, wherein after the passing of time equal to the time interval, the second background process increase the associated interest rate by an amount equal to the rate increment until the associated interest rate equals the maximum target rate.

12. A computer readable medium whose contents cause a computer system to perform a method for equalizing debt balance to home value in a reverse mortgage, the computer system having a server program and a client program with functions for invocation by performing the steps of:
   a) appraising of a reverse mortgage asset resulting in a reverse mortgage asset value;
   b) using a principal limit factor module for determining the principal limit factor of the reverse mortgage, the principal limit factor based on principal limit factor criteria;
   c) creating a reverse mortgage security instrument between the borrower and a lender with an associated interest rate;
   d) creating debt-to-asset-value equalization provisions in the reverse mortgage security instrument comprising:
      i) language granting the borrower the right to request a borrower-initiated appraisal during the reverse mortgage security instrument; and
      ii) language granting the lender the right to request a lender-initiated appraisal during the reverse mortgage security instrument, the borrower-initiated appraisal and the lender-initiated appraisal resulting in one or more reappraised reverse mortgage asset values, and the debt-to-asset-value equalization provisions defining a debt-to-asset-value reduction value and a debt-to-asset-value increase value;
   e) creating an electronic debt-to-asset-value equalization module to determine a ratio equal to the reappraised reverse mortgage asset values over the total reverse mortgage debt based upon the reappraised reverse mortgage asset values;
   f) reducing the associated interest rate in the reverse mortgage security instrument if the ratio is less than or equal to the debt-to-asset-value reduction value; and
   g) increasing the associated interest rate in the reverse mortgage security instrument if the ratio is equal to or greater than the debt-to-asset-value increase value.

13. The method of claim 1 wherein the equity component is selected from the group consisting of a fee simple interest, a remainder interest, and combinations thereof.

14. A method for equalizing debt balance to value in a reverse mortgage security interest on a computer comprising the steps of:
   appraising of a reverse mortgage asset resulting in a reverse mortgage asset value, wherein the reverse mortgage asset is owned by a borrower; and
   electronically using an electronic principal limit factor module on the computer for determining the principal limit factor of the reverse mortgage security interest, the principal limit factor based on at least one principal limit factor criterion including:
      a borrower's age;
      the borrower's health status;
      the reverse mortgage asset value; and
      the borrower's probability of moving;
   creating the reverse mortgage security instrument between the borrower and a lender with an associated interest rate, the reverse mortgage security interest having a debt component and an equity component in which title transfers from the borrower to the lender.

15. A method as recited in claim 14 further comprising the steps of:
   creating one or more debt-to-asset-value equalization provisions in the reverse mortgage security instrument comprising:
      language granting the borrower the right to susbequently request one or more borrower-initiated appraisals during the reverse mortgage security instrument; and
      language granting the lender the right to susbequently request one or more lender-initiated appraisals during the reverse mortgage security instrument, the one or more borrower-initiated appraisals and the one or more lender-initiated appraisals resulting in one or more reappraised reverse mortgage asset values, and the one or more debt-to-asset-value equalization provisions defining a debt-to-asset-value reduction value and a debt-to-asset-value increase value;
   creating a credit line, a lump sum, or a plurality of tenure payments to the borrower at the associated interest rate;
   creating an electronic accrual module for accruing a total reverse mortgage debt which is the total debt advanced to the borrower at the associated interest rate;
   electronically creating an electronic debt-to-asset-value equalization module on the computer to determine a ratio equal to the one or more reappraised reverse mortgage asset values over the total reverse mortgage debt based upon the reappraised reverse mortgage asset values; and
   after the time of appraisal, reducing the associated interest rate in the debt component of the reverse mortgage security instrument if the ratio is less than or equal to the debt-to-asset-value reduction value.

16. A method as recited in claim 14 further comprising the steps of:
   creating one or more debt-to-asset-value equalization provisions in the reverse mortgage security instrument comprising:
      language granting the borrower the right to susbequently request one or more borrower-initiated appraisals during the reverse mortgage security instrument; and language granting the lender the right to susbequently request one or more lender-initiated appraisals during the reverse mortgage security instrument, the one or more borrower-initiated appraisals and the one or more lender-initiated appraisals resulting in one or more reappraised reverse mortgage asset values, and the one or more debt-to-asset-value equalization provisions defining a debt-to-asset-value reduction value and a debt-to-asset-value increase value;

creating a credit line, a lump sum, or a plurality of tenure payments to the borrower at the associated interest rate;

creating an electronic accrual module for accruing a total reverse mortgage debt which is the total debt advanced to the borrower at the associated interest rate;

electronically creating an electronic debt-to-asset-value equalization module on the computer to determine a ratio equal to the one or more reappraised reverse mortgage asset values over the total reverse mortgage debt based upon the reappraised reverse mortgage asset values; and after the time of appraisal, increasing the associated interest rate in the debt component of the reverse mortgage security instrument if the ratio is equal to or greater than the debt-to-asset-value increase value.

\* \* \* \* \*